United States Patent [19]

Pelzer

[11] Patent Number: 4,894,448
[45] Date of Patent: Jan. 16, 1990

[54] PROCESS FOR THE PREPARATION OF LOW-VISCOSITY CELLULOSE ETHERS

[75] Inventor: Heinz Pelzer, Oestrich-Winkel, Fed. Rep. of Germany

[73] Assignee: Hoechst Aktiengesellschaft, Frankfurt am Main, Fed. Rep. of Germany

[21] Appl. No.: 271,347

[22] Filed: Nov. 14, 1988

Related U.S. Application Data

[63] Continuation of Ser. No. 901,297, Aug. 28, 1986, abandoned.

[30] Foreign Application Priority Data

Aug. 29, 1985 [DE] Fed. Rep. of Germany ....... 3530857

[51] Int. Cl.$^4$ ............................................. C08G 18/34
[52] U.S. Cl. ......................................... 536/84; 536/88
[58] Field of Search ..................................... 536/84, 88

[56] References Cited

U.S. PATENT DOCUMENTS

| | | | |
|---|---|---|---|
| 2,512,338 | 6/1950 | Klug et al. | 260/231 |
| 2,749,336 | 6/1956 | Boddicker et al. | 260/231 |
| 2,895,891 | 7/1959 | Miller | 204/154 |
| 2,912,431 | 11/1959 | Leonard et al. | 260/232 |
| 3,138,564 | 6/1964 | Borunsky | 260/17 |
| 3,391,135 | 7/1968 | Owno et al. | 536/88 |
| 3,394,127 | 7/1968 | Sommers | 260/232 |
| 3,728,331 | 4/1973 | Savage | 260/231 R |
| 4,048,433 | 9/1977 | Burns et al. | 536/88 |
| 4,061,859 | 12/1977 | Cheng | 536/88 |
| 4,316,982 | 2/1982 | Holst et al. | 536/88 |

FOREIGN PATENT DOCUMENTS

| | | |
|---|---|---|
| 667864 | 10/1938 | Fed. Rep. of Germany . |
| 953944 | 4/1964 | United Kingdom . |
| 1131251 | 10/1968 | United Kingdom . |

OTHER PUBLICATIONS

Ephraim, F.: Inorganic Chemistry; Thorne, P.C.L. and Roberts, E R.: (1943). pp. 367, 368 and 376–378.
Textile Research Journal, vol. 40, Feb. 1970, pp. 178–184, Lancaster, US; A. Kantouch et al.: "Action of sodium chlorite on cellulose and cellulose derivatives".
Faserforschung und Textiltechnik 13, 1962, No. 2, pp. 70–79; "Investigations of the Grafting of Carboxymethylcellulose with Acrylonitrile".
Journal of Polymer Science, vol. 4, 1966, pp. 2683–2703; "Mechanism of Ozone Attach on α–Methyl Glucoside and Cellulosic Materials".

Primary Examiner—Joseph L. Schofer
Assistant Examiner—Peter D. Mulcahy
Attorney, Agent, or Firm—Foley & Lardner, Schwartz, Jeffery, Schwaab, Mack, Blumenthal & Evans

[57] ABSTRACT

The invention relates to a process for the preparation of low-viscosity cellulose ethers, in particular of methylcelluloses having viscosities of less than 100 mPa.s, measured in 1.8% aqueous solution. The process is carried out in such a way that an aqueous sodium chlorite solution is added preferably during and/or after alkalization, but before etherification.

9 Claims, No Drawings

PROCESS FOR THE PREPARATION OF LOW-VISCOSITY CELLULOSE ETHERS

This application is a continuation of application Ser. No. 901,297, filed Aug. 28, 1986, now abandoned.

BACKGROUND OF THE INVENTION

The present invention relates to a process for the preparation of low-viscosity cellulose ethers, for example, hydroxyalkylcelluloses, carboxymethylcelluloses, mixed ethers and in particular methylcelluloses having viscosities below about 100 mPa.s, measured in aqueous solution, with the use of chlorite solutions.

Cellulose ethers of different properties are required for various fields of application. In addition to their solubility properties or their degree of substitution, one of the important parameters for characterizing the cellulose ethers is their viscosity. Essentially three process methods are described in the literature for the preparation of low-viscosity water-soluble cellulose ethers, but all these have the main aim of breaking down the molecule chains, i.e., to produce intermediates or end products of a lower molecular weight from starting materials of a relatively higher molecular weight. This aim is achieved either by degradation of the cellulose molecule before or during etherification or by degradation of the cellulose ether molecule. In the first two process methods, an essential disadvantage of the intermediates obtained by these methods is that, even before the usually applied purification stages in the processes for the preparation of these cellulose ethers, they are obtained as relatively short-chain molecules, so that they either swell excessively in the purification fluid (consisting in most cases of water or aqueous organic solvents) or dissolve therein to an undue extent, along with the impurities.

For carrying out the third process variant there have been disclosed, for example, degradation with chemical oxidizing agents—such as hypochlorite or $H_2O_2$—or with high-energy radiation.

German Patent No. 667,864 describes a process for lowering the viscosity of aqueous solutions of cellulose ethers, wherein microorganisms or enzymes are allowed to act on aqueous cellulose ether solutions. The viscosity is lowered to about 50% of the original value.

In the process for lowering the viscosity of cellulose ethers by means of hydrogen peroxide according to German Auslegeschrift No. 2,016,203 (corresponding to U.S. Pat. No. 3,728,331), a substantially dry, free-flowing cellulose ether of small particles is mixed with .10 to 50 % strength hydrogen peroxide solution, and this mixture is heated to a temperature of 50° to 150° C. until the cellulose ether has a lower viscosity. Depending on the quantity of $H_2O_2$, the reaction temperature and duration, as well as the magnitude of the initial viscosity, the viscosity is lowered to about 1% of the initial value.

Swiss Patent No. 461,455 discloses a process for the preparation of low-viscosity water-soluble cellulose ethers by oxidative degradation of higher-viscosity ethers with $H_2O_2$, wherein the water-moist cellulose ether is mixed with an aqueous solution of $H_2O_2$, a certain mixing ratio of ether, $H_2O_2$ and water content being adjusted, and the mixture is then dried at 100° to 250° C. until the $H_2O_2$ has been fully consumed. The viscosity is lowered to about 0.5% of the initial value.

British Patent No. 953,944 describes a process for lowering the viscosity of water-soluble, non-ionic cellulose ethers, wherein the ethers are reacted with an aqueous solution of $H_2O_2$ at temperatures of about 70° to 100° C. in aqueous suspension or by spraying. The viscosity is lowered to about 0.5% of the initial value.

In the process according to U.S. Pat. No. 2,512,338, a mixture of $H_2O_2$ or a metal peroxide and a metal salt with an Mn, Co, Fe or Pb ion is added to the reaction mixture of alkali cellulose and an etherifying agent, in order to influence the viscosity. The viscosity is lowered to about 0.3% of the initial value.

U.S. Pat. No. 2,895,891 discloses irradiation of cellulose ethers with ionizing radiation, which leads to a reduction of viscosity of non-ionic and ionic cellulose ethers in the dry state; however, a decrease in viscosity is observed in the (water)-moist state only in the case of ionic cellulose ethers, but not in the case of non-ionic cellulose ethers, and the latter are crosslinked under these conditions.

In U.S. Pat. No. 2,912,431, a salt having an alkali metal, alkaline earth metal or ammonium cation and a hypohalite, peroxide or periodate anion is added to a mixture of a fibrous carboxyalkylcellulose and an aqueous alcohol for bleaching, for lowering the viscosity and for compaction. The viscosity is lowered to about 1% of the initial value, and the reaction temperature is between 40° and 80° C.

In the process according to U.S. Pat. No. 4,061,859, for the purpose of lowering the viscosity with simultaneous reduction of the molecular weight, a dry cellulose ether powder is reacted with a) gaseous hydrogen halide at up to about 80° C. and then b) with gaseous sulfur dioxide at room temperature. The additional process step b) prevents the discoloration (essentially yellowing) of the cellulose ether, which occurs when step a) alone is carried out. The viscosity is lowered to about 0.05% of the initial value, and the moisture content in the cellulose ether powder which is to be treated should not exceed a maximum value of about 5%.

German Offenlegungsschrift No. 1,468,835 (corresponding to U.S. Pat. No. 3,394,127) discloses a process for the preparation of alkali metal salts of carboxymethylcellulose, wherein, after etherification, a bleaching agent is added in order to increase the whiteness of the product. When hydrogen peroxide is used, the viscosities reached are stated to be in the range from about 20 to 50 mPa.s, whereas when sodium chlorite is used as a bleaching agent, only viscosities above 1000 mPa.s are obtained, and the desired whiteness is in the same range as in the case of using hydrogen peroxide.

U.S. Pat. No. 2,749,336 describes a process mainly for the preparation of carboxymethylcellulose, wherein a sodium hypochlorite solution is added to the sodium hydroxide solution containing isopropanol before the addition of monochloroacetic acid.

Disadvantages in the known processes with the use of hydrogen peroxide or hypochlorite solutions as the oxidizing agents are, on the one hand, the necessity of carrying out the reaction at a temperature in the range from 40° to 150° C. and, on the other hand, the relatively easy decomposition of such solutions due to the influence of temperature and light, so that the content of active ingredient can vary widely. As a result, the viscosity can differ widely from batch to batch, which is highly undesirable.

A further disadvantage is the instability of the viscosity of the products obtained by these processes, manifested by the fact that the viscosity frequently falls further during storage of the products. The reduction in viscosity of the cellulose ethers should be carried out, as far as possible, with the already washed, still moist products. Therefore, the degradation with high-energy radiation is disadvantageous, since it can then not be carried out with the non-ionic cellulose ether types without interfering side reactions (crosslinking), and a degradation with HCl gas and/or $SO_2$ gas is also disadvantageous, since in that case the moisture must already have been removed to a very large extent. Moreover, serious corrosion problems arise when the last-mentioned gases are used.

Reactions of cellulose or cellulose ether derivatives with ozone have also already been disclosed. For example, U.S. Pat. No. 3,138,564 discloses a process wherein polymerizable monomers containing vinylidene groups are grafted onto a polysaccharide which was treated beforehand in aqueous dispersion or solution with ozone or an ozonecontaining gas. The excess ozone is blown out of the reaction mixture by means of an inert gas. Among many others, carboxymethylcellulose is also mentioned as a polysaccharide starting material. This reaction between a polysaccharide and ozone serves to generate free-radical intermediates for the grafting which is subsequently to be carried out. A controlled degradation reaction is evidently not intended.

According to the paper "Untersuchungen ueber die Pfropfung von Carboxymethylcellulose mit Acrylnitril [Investigations of the grafting of carboxymethylcellulose with acrylonitrile]" by C. Simionescu, D. Feldman and C. Vasiliu in: Faserforschung und Textiltechnik 13, 1962, No. 2, pages 70 to 79, the grafting can be initiated in the presence of $Ce^{4+}$ ions by ultrasonics, UV radiation, a magnetic field or by ozonization. A certain decrease in viscosity is here also pointed out, which can lead to a reduction of the molecular weight by one half. In addition to carboxymethylcellulose, methylcellulose is also employed as a starting material. The treatment of the cellulose ethers present in the form of films is carried out in an aqueous, weakly acidic solution in the simultaneous presence of $Ce^{4+}$ ions.

In the paper "Mechanism of ozone attack on α-methyl glucoside and cellulosic materials" by A.A. Katai and C. Schuerch in: Journal of Polymer Science, volume 4, 1966, pages 2683 to 2703, the interaction of ozone with methylcellulose of a degree of substitution of 1.5 is described. With increasing quantity of ozone converted, the molecular weight of the methylcellulose decreases and the number of carbonyl or carboxyl groups on the molecules increases, these changes taking place in the case of ozonization both in an oxygen atmosphere and in a nitrogen atmosphere. The ozonization process is carried out in a 1.6% by weight aqueous methylcellulose solution.

A disadvantage of these processes of reacting water-soluble cellulose ethers with ozone is that the reaction is carried out in aqueous solution since, as a result, an additional dissolution stage would have to be used in large-scale plants for the production of cellulose ethers, and this would lead, for example, to large capacity vessels (highly concentrated cellulose ether solutions can hardly be prepared) for dissolution, on the one hand, and to energy consumption for removing the solvent again, on the other hand.

SUMMARY OF THE INVENTION

It is therefore an object of the present invention to provide an improved process for the preparation of low-viscosity cellulose ethers.

In particular, it is an object of the invention to provide such a process which can be carried out without major expense for apparatus, which leads to products having a very uniform viscosity which remains stable during storage, and which leads to easily purified products.

It is also an object of the invention to provide a low viscosity methyl cellulose product having a uniform viscosity.

In accomplishing these objects, there has been provided according to one aspect of the present invention a process for the preparation of low-viscosity cellulose ethers, comprising the steps of subjecting cellulose to alkalization with an aqueous sodium hydroxide solution; subsequently etherifying the alkalized cellulose; and before the etherifying step, adding an aqueous sodium chlorite solution. Preferably, the aqueous sodium chlorite solution is added during the alkalization step or subsequent to the alkalization step.

Further objects, features and advantages of the present invention will become apparent from the detailed description of preferred embodiments which follows.

DETAILED DESCRIPTION OF THE PREFERRED EMBODIMENTS

Low-viscosity cellulose ethers are here to be understood as those which have viscosities of about 3,000 mPa.s or lower, preferably below about 1,000 mPa.s, in 1.8% by weight aqueous solution.

The invention provides a process in which cellulose is alkalized with aqueous sodium hydroxide solution and then etherified. The process comprises adding an aqueous sodium chlorite solution preferably during and/or after alkalization, but before etherification.

The sodium chlorite solution is normally used in a quantity of about 2 to 20 kg (relative to the solids content) per 1,000 kg of cellulose, with a range from about 4 to 12 kg per 1,000 kg of cellulose being preferred.

The products prepared by the process according to the invention show an extremely uniform viscosity, that is to say they show neither a variation within the particular batch nor between different batches, and they can be readily washed without appearance of slimy products, as in the products of varying viscosity according to the state of the art.

The process is suitable for the preparation of hydroxyalkylcelluloses, carboxymethylcelluloses and mixed ethers, and it is used especially in the preparation of methylcelluloses.

The invention is described in more detail in the examples which follow, it being understood that these examples are illustrative embodiments only.

EXAMPLE 1

1,000 g of pulverized cellulose (degree of polymerization about 700) were alkalized with 1,600 ml of a 37% by weight sodium hydroxide solution to which 4 g of $NaClO_2$ in aqueous solution had been added, and then etherified with ethylene oxide and methyl chloride at a temperature below 100° C. by the known circulating-gas process. A part of the methyl-hydroxyethyl-cellulose obtained was washed free of by-products without any problems (no slime) and made up to a granulated product. A 1.8% by weight aqueous solution had a viscosity 25 mPa.s. The product did not show any significant viscosity differences within the charge.

When the same process was used without addition of NaClO$_2$, a viscosity of 400 mPa.s was obtained.

EXAMPLES 2 and 3

The procedure of Example 1 was repeated, except that 8 and 16 g of NaClO$_2$, in aqueous solution, respectively, were added to the sodium hydroxide solution. The viscosities of a 1.8% by weight aqueous solution were 20 and 14 mPa.s, respectively. The results corresponded to those of Example 1.

EXAMPLE 4

50 g of pulverized cellulose (degree of polymerization about 700) were suspended in 2 liters of dimethylglycol and stirred for 20 minutes with 35.6 g of 50% by weight sodium hydroxide solution, to which 4 ml of a 20% by weight NaIO$_2$ solution had been added. 44.1 g of sodium chloroacetate were then added, and the mixture was heated to 75° C. and held for 1 hour at this temperature. After cooling, the mixture was neutralized with acetic acid, and the solvent was removed over a suction filter. After washing three times, each with 1.5 liters of 70% ethanol without any problems, the product was dried. A 1.8% by weight aqueous solution of the carboxymethylcellulose obtained had a viscosity of 23 mPa.s. The viscosity, measured across the entire charge, was very uniform.

EXAMPLE 5

Example 4 was repeated, with the difference that 8 ml of a 20% by weight NaClO$_2$ solution were added. A 1.8% by weight aqueous solution of the product obtained had a viscosity of 11 mPa.s.

EXAMPLE 6

In a large-scale batch, 1,000 kg of pulverized cellulose (degree of polymerization about 700) were alkalized with 37% by weight strength sodium hydroxide solution and 9 kg NaClO$_2$ in aqueous solution and then etherified as described in Example 1.

A product which could be readily washed, was very uniform and had a viscosity of 20 mPa.s (measured as a 1.8% by weight solution) was obtained.

EXAMPLE 7

In a large-scale batch, 1,000 kg of pulverized cellulose of a mean degree of polymerization of 1,350 were alkalized with 37 % by weight strength sodium hydroxide solution and 1.0 kg of NaClO$_2$ in aqueous solution and then etherified as described in Example 1.

A product was obtained which had a viscosity of 950 mPa.s (measured as a 1.8% by weight solution) and which corresponded in its properties to a methylcellulose prepared from cellulose of low degree of polymerization.

A comparative etherification of the same cellulose without an addition of sodium chlorite during the alkalization led to products having a viscosity of 1,800 mPa.S.

EXAMPLE 8

A batch was run as in Example 7, but the added quantity of NaClO$_2$ was increased to 4.0 kg.

The finished product after washing had a viscosity of 270 mPa.s in a 1.8% by weight solution.

COMPARISON EXAMPLE 1

Under the same conditions as described in Example 6, a sodium hypochlorite solution was used in place of a sodium chlorite solution. 12 kg of sodium hypochlorite were employed in each of two experiments. The two products had viscosities of 151 and 31.9 mPa.s (measured in a 1.8% by weight aqueous solution) and were also very non-homogeneous across the charge. Also the products were difficult to wash because of slimes.

COMPARISON EXAMPLE 2

This was carried out under the conditions of Comparison Example 1, but 16 kg of sodium hypochlorite were used.

The viscosities measured within the charge were between 44.1 and 40.5 mPa.s (measured in a 1.8% by weight aqueous solution), which represents an intolerable fluctuation.

As demonstrated by the above examples, products which can be readily washed, are uniform within the charge and also from charge to charge and have a low viscosity can be obtained when sodium chlorite solutions are used, whereas intolerable fluctuations arise when sodium hypochlorite is used.

This result must be regarded as very surprising, and it was not foreseeable, since both compounds are oxidizing agents, that is to say conventional bleaching agents.

What is claimed is:

1. A process for the preparation of low-viscosity cellulose ethers, comprising the steps of:
    subjecting cellulose to alkalization with an aqueous sodium hydroxide solution;
    subsequently etherifying the alkalized cellulose; and
    before said etherifying step, adding an aqueous sodium chlorite solution.

2. A process as claimed in claim 1, wherein from about 2 to 20 kg of sodium chlorite (relative to the solids content) per 1,000 kg of cellulose are added.

3. A process as claimed in claim 2, wherein from about 4 to 12 kg of sodium chlorite per 1,000 kg of cellulose are added.

4. A process as claimed in claim 1, wherein the aqueous sodium chlorite solution is added during the alkalization step.

5. A process as claimed in claim 1, wherein the aqueous sodium chlorite solution is added subsequent to the alkalization step.

6. A process as claimed in claim 1, wherein the alkalized cellulose is etherified to produce an ether comprising hydroxyalkylcellulose, carboxymethylcellulose or methylcellulose.

7. A process as claimed in claim 1, consisting essentially of the recited steps.

8. A process as claimed in claim 1, wherein the cellulose ethers have a viscosity below about 1000 mPa.s, in 1.8% by weight aqueous solution.

9. A process as claimed in claim 7, wherein the cellulose ethers have a viscosity below about 1000 mPa.s, in 1.8% by weight aqeuous solution.

* * * * *